United States Patent [19]

Lionti et al.

[11] Patent Number: 5,452,369
[45] Date of Patent: Sep. 19, 1995

[54] PROCESS FOR PRODUCING A SYNTHESIZED REFERENCE IMAGE FOR THE INSPECTION OF OBJECTS

[75] Inventors: Rosolino Lionti, Seyssins; Michel Darboux, Grenoble, both of France

[73] Assignee: Commissariat A L'Energie Atomique, Paris, France

[21] Appl. No.: 140,480

[22] Filed: Oct. 25, 1993

[30] Foreign Application Priority Data

Nov. 9, 1992 [FR] France .................. 92 13470

[51] Int. Cl.⁶ .......................................... G06K 9/60
[52] U.S. Cl. ............................... 382/141; 382/217; 382/218; 382/278
[58] Field of Search .................. 382/8, 30, 18, 42, 48, 382/34; 364/474.24, 468

[56] References Cited

U.S. PATENT DOCUMENTS 5,046,113 9/1991 Hoki ......................................... 382/8
5,086,477 2/1992 Yu et al. .................................. 382/8

FOREIGN PATENT DOCUMENTS 0381067 8/1990 European Pat. Off. ...... G06F 15/70
0538111 4/1993 European Pat. Off. ...... G06F 15/72

OTHER PUBLICATIONS

Takeuchi, S., et al., "Advanced 5X Reticle Inspection Technologies for ULSI Devices" 5–6 Mars 1990, Proceedings of Spie, Integrated Circuit Metrology, Inspection and Process Control IV vol. 1261.

Primary Examiner—Leo H. Boudreau
Assistant Examiner—Phuoc Tran
Attorney, Agent, or Firm—Burns, Doane, Swecker, & Mathis

[57] ABSTRACT

A process for synthesizing a reference image of an object by applying real image characteristic element data to characteristic elements of a descriptive (CAD based generated) image. The process includes preprocessing the descriptive image data by identifying characteristic elements of the object in the descriptive dam and determining the coordinates of the characteristic elements. The first format of the descriptive image data and the coordinates of the characteristic elements are subsequently changed to an equivalent descriptive image and equivalent coordinates of the characteristic elements having a second format. The process also includes the acquisition of at least one real image of the object defined in the second format; sampling at least one characteristic element of the real image of the object; centering and preshifting the samples of the object with respect to the second format and applying the obtained centered and preshifted samples of the real image to the equivalent characteristic elements of the descriptive image.

7 Claims, 6 Drawing Sheets

PROCESS FOR PRODUCING A SYNTHESIZED REFERENCE IMAGE FOR THE INSPECTION OF OBJECTS

DESCRIPTION

The present invention relates to a process making it possible to produce a synthesis image used, during the comparison of images, as a reference image.

It more particularly applies to the field of industrial inspection, where the aim is to check an object by comparing the image of said object with a synthesized reference image. More specifically, the invention can be applied to the inspection of integrated circuits produced on an industrial production line.

It is known to detect possible defects of industrial objects and more particularly integrated circuits by using comparison processes installed in vision machines. In these processes, one of the images results from reality and represents the object to be inspected, whereas the other, so-called reference image corresponds to a defect-free, perfect object. In certain known applications, said reference image representing a perfect object is constructed from informations coming from a computer-aided design (CAD) data base. It is then a binary synthesis image. However, the design binary image obtained in this way from design data is not always sufficiently precise compared with reality, particularly with regards to rounded portions, curves and light contrasts which exist in reality.

In order to make these images more "realistic", it is possible to use a process based on a filtering of the design image obtained from the CAD data. This filtering more particularly makes it possible to round angles in order to make said image more realistic and closer to the image of the object to be inspected. However, the accuracy of such a process is limited.

Such a process is described in the article "Advanced 5X reticle inspection technologies for U.L.S.I. devices", published by Mrs. Takeuchi, Joseph, Yoshida, Moriizumi, Parker and Watakabe in the journal S.P.I.E., Vol. 1,261, 1990.

A process for generating a new graphic scene by replacing certain graphic motifs or patterns is described in EP-A-354 031. This process consists of carrying out a first stage of choosing graphic patterns which are to be sought and then a second search stage carried out in the graphic scene with respect to the occurrences of the previously chosen graphic patterns and finally in a third stage replacing in said graphic scene the aforementioned graphic patterns by other patterns generally coming from a library.

Such a process cannot be used for generating images intended to serve as a reference during an inspection by comparison of objects such as integrated circuits. Thus, the comparison of such images with the images of real objects is not sufficiently precise for detecting the very small defects of the objects to be inspected. The above-described process consequently does not make it possible to generate a reference image which is close enough to a real image not to have any discontinuity, particularly with regards to the grey level variations of the image.

The present invention specifically aims at obviating the disadvantages of the known processes. To this end, it proposes a process making it possible to replace, on a binary image from a CAD data base, the characteristic elements of the object (or graphic patterns) by real images of said characteristic elements.

More specifically, the invention relates to a process for producing a synthesized reference image with the aid of image processing means and cameras, characterized in that it comprises, on the basis of a descriptive image of an object to be inspected contained in the processing means and defined in a first format relative to the processing means, performing the following operations:

a) determination, in the descriptive image, of characteristic elements of the object;

b) determination of the coordinates of the characteristic elements in the descriptive image;

c) acquisition, with the aid of cameras, of at least one real image of the object defined in a second format relative to said cameras;

d) sampling, on a real image of the object, samples each of which contains the real image of at least one characteristic element;

e) changing the format in order to transform the descriptive image of the object and the coordinates of the characteristic elements defined in the first format into an equivalent descriptive image and equivalent coordinates of the characteristic elements defined in the second format;

f) centering the samples as a function of the equivalent coordinates obtained during the format change operation e);

g) positioning the thus centered samples on the equivalent descriptive image given in the second format.

Advantageously, said process also includes an overall shift operation performed after the format change operation e) and consisting of determining an overall or total shift value of the real image of the object compared with the equivalent descriptive image, by the application of a correlation between said real and equivalent descriptive images.

The format change operation e) can consist of deducing from the equivalent coordinates of the characteristic elements obtained during the format change operation e), integral values of coordinates and fractional local shift values.

The sampling operation d) can firstly consist of choosing samples, whose coordinates in the real image of the object correspond to integral values of coordinates obtained during the format change operation e).

Following the sample centering operation f), the process according to the invention can have a shift operation consisting of shifting the centered samples in accordance with a plurality of previously defined values. This shift operation can consist of establishing a centered and preshifted sample library, the samples to be positioned on the equivalent descriptive image being chosen from within said library.

According to an embodiment of the invention, the format change operation e) consists of converting the descriptive image of the object and the coordinates of the characteristic elements of the first format into the second format with the aid of a conversion table.

According to another embodiment of the invention, the process comprises, between the operation c) of acquiring the real image of the object and the format change operation e), an operation of producing an image of grey levels, which is defined in the first format and obtained by introducing, into the descriptive image of the object, grey levels read on the real image of the object.

The invention is described in greater detail hereinafter relative to non-limitative embodiments and with reference to the attached drawings, wherein show.

Throughout the following description as an example of the performance of the invention, use will be made of the inspection of integrated circuits on wafers. However, it is obvious that other objects could be involved or simply portions of integrated circuits. Thus, the process can be performed for an integrated circuit portion and repeated the same number of times as there are portions or fields to be inspected within the integrated circuit in question.

Figure 1:
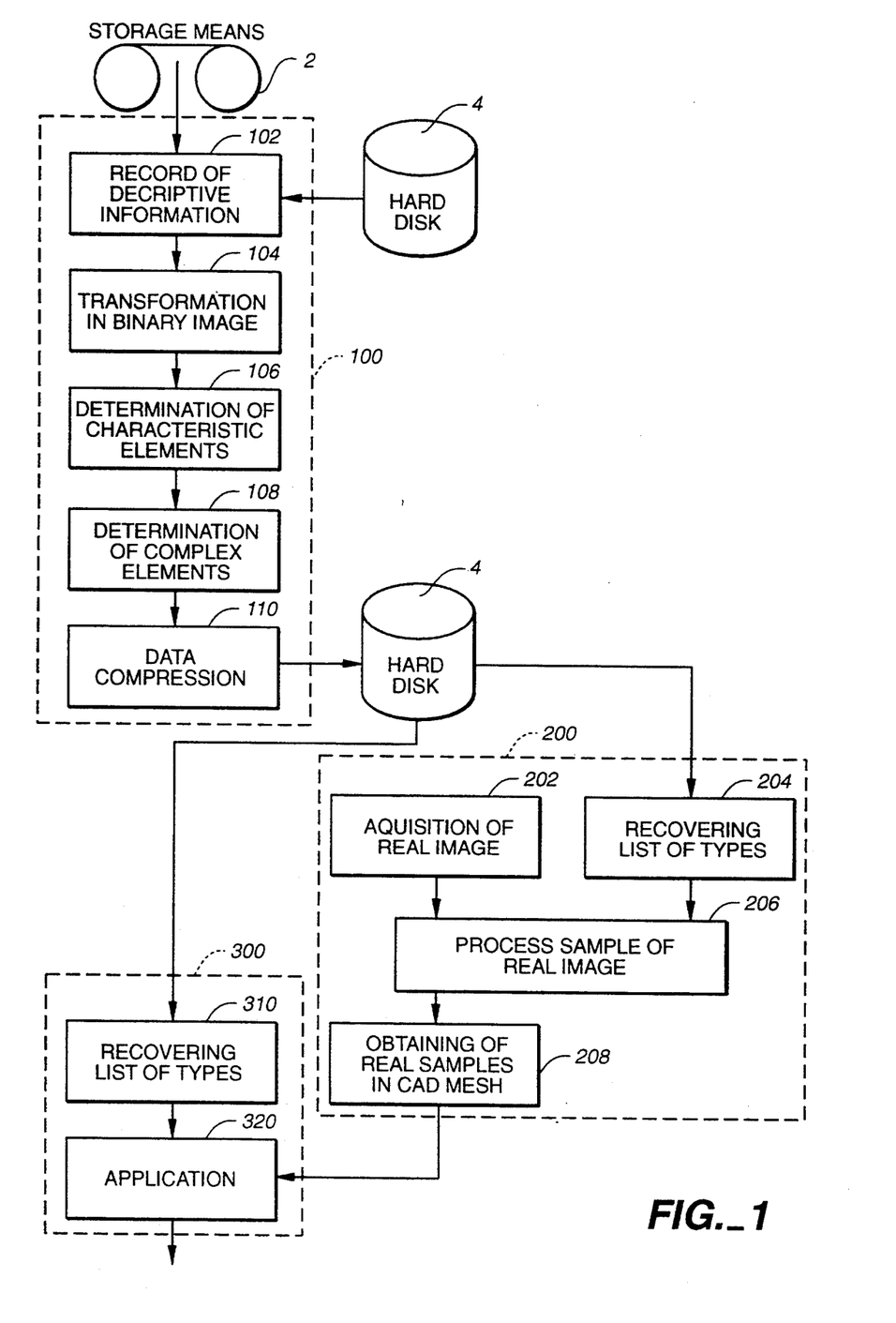
FIG. 1 a flowchart showing the different operations performed for carrying out the process of the invention.

FIG. 1 is a flowchart describing the different operations carried out during the performance of the process of the invention. This process for producing a synthesized reference image can be broken down into three image data processing phases:

a CAD data preprocessing phase 100,
a characteristic element processing phase 200,
a synthesis phase 300.

More specifically, the CAD data preprocessing phase 100 essentially consists of translating the CAD data into binary images, which are also referred to as descriptive images of the object to be inspected. Thus, the CAD data are "compact" data, i.e. each characteristic element contained in the CAD data base is only described once therein, no matter what the number of occasions when it is present in the integrated circuit. Therefore said CAD data are retranslated into binary image form, where the elements appear the same number of times as they are actually present on the integrated circuit. This binary image has the advantage of representing a field of the integrated circuit on a display screen.

Thus, the preprocessing phase 100 involves a first stage 102 of reading into the CAD data base data describing the circuit and contained in a mass store such as a magnetic tape 2 and informations which may already be known and stored e.g. in the hard disk 4.

These CAD data are advantageously retranslated, i.e. transformed, during the binary image synthesis stage 104, into a binary image form in order to facilitate subsequent processing operations. The resolution of the binary image obtained in stage 104 is the same as that of the CAD data base. Thus, in order to limit the information loss which can occur during such a transformation, the said binary image is synthesized in the CAD mesh corresponding to the descriptive system of the integrated circuit.

The term "CAD mesh" is understood to mean the respective sampling intervals in the two directions of the plane containing the image. This CAD mesh can e.g. be 0.1×0.1 pm or 0.05×0.05 pm, when the integrated circuit is very dense, i.e. when it has numerous characteristic elements. During the present description the terms "CAD mesh" and "CAD format" will be used in a random manner.

The detection stage 106 of simple or single types consists of determining the characteristic elements of the integrated circuit to be inspected.

A prior observation during the preprocessing phase 100, e.g. by a user, makes it possible to identify the different characteristic elements such as patterns, portions of patterns or groups of patterns, present in the integrated circuit. On the basis of said visual observation, a definition takes place of the characteristic elements respectively in binary mask form which will be used for the extraction from the binary image of informations relative to the position of said characteristic elements coded in this way.

Thus, the characteristic elements of an integrated circuit are e.g. one or more pixels representing the grey level of the background of the circuit (called uniform zones of a first type), one or more representative pixels of the grey level of the patterns of the circuit (called uniform zone of a second type), corners of patterns, transitions (i.e. elements of the border between the background and the pattern), special elements such as memory cells, contact holes, etc.

A computer produces lists in which a characteristic element generally represented by a code is associated with one position. When said characteristic element is present several times in the integrated circuit, it is also present several times in the list where it is associated with each of its positions. These lists are recorded on the hard disk 6 to which the computer can have access at any time.

The position detection of the characteristic elements takes place on the theoretical binary image obtained during stage 104, which is completely free from noise. It therefore consists of a simple decoding of configurations corresponding to said characteristic elements. Thus, the binary image is scanned using a window with a few pixels per side. The window content is correlated with the coded characteristic elements in the form of masks. The content of the window corresponds to one of the sought characteristic elements. The window generally has the same size as the mask of the characteristic element being investigated.

Thus, during stage 106, an image of simple types is created, i.e. an image representing the position of the characteristic element types in the binary image (whereby these characteristic elements can be background/pattern elements, transitions or corners).

These position informations are obtained with an accuracy equal to the resolution of the design data base, said resolution generally exceeding the resolution of a real image, for which said resolution is given by the size of the pixels of the camera used for the acquisition of the real image. Thus, said detection is performed with a subpixel precision (i.e. approximately 1 subpixel) in the camera mesh.

The detection stage 108 for complex types consists of seeking, in the image of simple types determined in stage 106, the complex type elements (also called macropatterns) by correlation with model elements described in the form of transitions and corners. Thus, the complex type elements generally have a size greater than that of the simple type elements. It is also faster to seek them in the simple type image than in the actual binary image.

The data compression stage 110 consists of producing a list of different types. This list contains the characteristic elements and their associated positions. This list, as well as the theoretical width of a pattern, are e.g. stored in the hard disk 6, from which the informations contained in said list will be read out during the synthesis phase 300.

The coding of the image of types in the form of a list makes it possible to condense the informations contained in the type image and therefore reduce the volume of the data to be stored during the preprocessing phase. This information condensation advantageously makes it possible to reduce the transfer time for said informations.

In another embodiment, the said list can be directly obtained following the binary image synthesis stage 104. The passage through a type image is not obligatory and is dependent on the choice of processing operations used for obtaining the type list from the stage 104. The processing phase 200 relates to the acquisition of real images of the characteristic elements.

In general terms, when the real image of the integrated circuit or a portion thereof is acquired, the user samples therefrom the image portions corresponding to the characteristic elements. These image portions, also called samples, can be individual or grouped pixels, row portions, column portions, etc.

These image portions are chosen in defect-free manner. For this purpose, the user selects the circuit to be used for this phase e.g. by means of a microscope. It is also the user who chooses on said circuit the portions of the image used in the remainder of the processing, so that they make it possible to produce a reference image for all the circuits to be inspected having elements of the same type.

More specifically, the acquisition of the real image takes place during a stage 202. This real image is e.g. selected with the aid of an inspection system in a semi-automatic mode. This inspection system enables the user carrying out the real image selection to move an observation field on the surface of the integrated circuit. Thus, the user analyses the constitution of the circuit in order to choose the most appropriate characteristic elements. In other words he seeks a field of the circuit which is free from defects and which contains the chosen characteristic elements. The real image of this field is then acquired and called "learning image".

As an example of learning, when the integrated circuit to be inspected is not very dense and has widely varying patterns, the operation of taking samples relates to the corners and transitions taken individually. Conversely, when the integrated circuit is dense, the user takes larger samples, such as complete patterns of memory cells or contact holes. Each contact hole has four corners and four transitions, but these transitions and corners are very small and close to one another, which requires a processing close to the resolution limit. Therefore, in the case of a very dense integrated circuit, it is preferable to take larger samples.

In certain cases, it is difficult to determine a single field containing all the defect-free characteristic elements. According to the invention, it is then possible to choose several fields, i.e. several learning images, which will be successively processed.

In addition, phase 200 consists on the one hand of carrying out the acquisition of the real image to be processed and on the other reading, during stage 204, the coordinates of the characteristic elements contained in the list of types. Crude samples are then taken from the real image and processed during the operation 206. The processing of these crude samples can consist of a centering operation and an operation of shifting the samples as a function of the coordinates of the characteristic elements on the binary image. This operation 206 will be described in greater detail in FIG. 2. These processed crude samples are then called "real samples" (reference 208).

The synthesis phase 300 consists of replacing in the image being synthesized, i.e. in the type image, the values of pixels by new values corresponding to those real samples of the characteristic elements coming from the processing phase 200. This operation of replacement by real samples is carried out for each of the positions detected in the preprocessing phase 100.

More specifically, the stage 310 of reading the list of types consists of seeking, in the hard disk 6, the informations contained in said list. There is a decompression of the data (namely the reverse operation to that consisting of transforming the type image into a type list), in order to again find the type image to which is applied, in an operation 320, the real samples determined during the phase 200 in order to produce the synthesized reference image.

This application operation 320 consists, using a substituting method, applying the samples taken in the learning image to the pixels identified during the characteristic element determination operation 106. Following operation 320, a synthesized image is obtained having grey levels, as the real image.

According to another embodiment of the invention, operations 310 and 320 can be combined. Thus, the type image is not re-created, the real samples being directly applied, as a function of coordinates obtained in the sensor mesh by the conversion of known coordinates into the CAD mesh. As opposed to the CAD mesh, the sensor mesh is that in which the real image is produced, i.e. the mesh or format of the camera.

Figure 2:
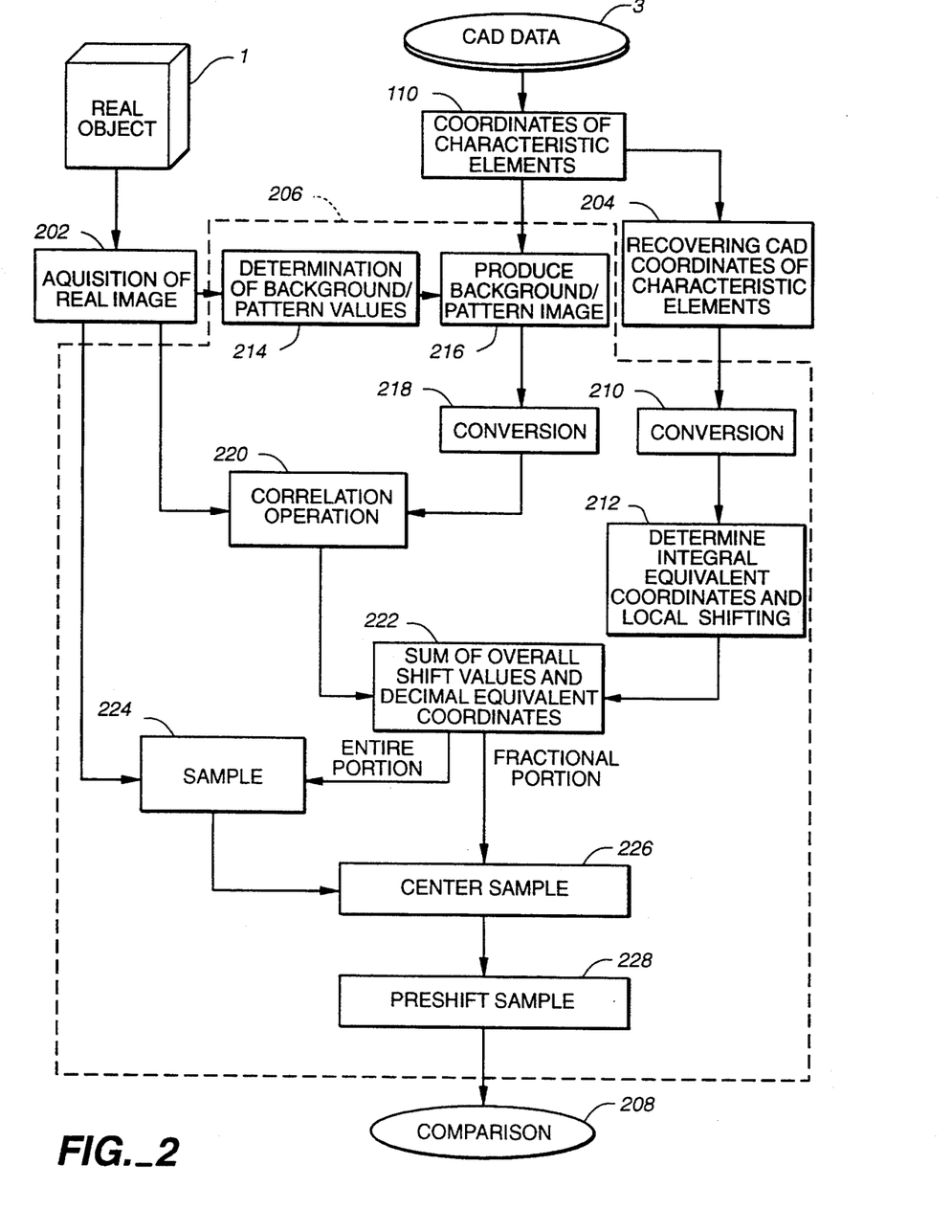
FIG. 2 a flowchart showing in greater detail the sampling and processing stage for the samples according to FIG. 1.

FIG. 2 is the flowchart describing in greater detail the operation 206 of taking and processing samples of the real image. The object to be inspected is represented by the reference 1. The data from the CAD data base, on the basis of which the phase 100 is performed, are designated 3. The object to be inspected and the CAD data are only shown in such a way as to permit a better understanding of the stages which will be described, their detailed description having already been provided. This also applies to the already described stages 110, 202 and 204.

The stage 206 of taking and processing samples involves format changing operations. The coordinates of the characteristic elements stored in type lists (reference 110) are defined in the CAD mesh or format. These coordinates are consequently read during the operation 204 in their CAD format. The values of these coordinates are integers, because they have been directly determined on the binary image, which has also been defined in CAD format.

Then, during stage 210, these coordinates are converted into equivalent coordinates defined in the sensor mesh. This conversion 210 of integral coordinate values has the effect of supplying decimal equivalent coordinate values. An operation 212 of determining integral equivalent coordinates and local shifting then consists of deducing, from the decimal equivalent coordinate values, the integral portion and the fractional portion. The integral portion corresponds to equivalent coordinates of characteristic elements defined in the sensor mesh and the fractional portion corresponds to a local shift.

An operation 214 of determining the background-/pattern values, also called B/P values, consists of producing a histogram of the grey levels of the real image obtained in stage 202. This histogram makes it possible to observe the distribution of the grey levels on the real image. The most frequently present grey levels are integrated into the binary image obtained in stage 110 so as to produce a background/pattern image (stage 216 of the process). The background/pattern image produced in this way in 216 is therefore a descriptive image having several grey levels, unlike the binary image of stage 110 which only has two levels, i.e. black and white. Such a background/pattern image is closer to the real image than a simple binary image. A correlation between the background/pattern image and the real image will provide more accurate results.

However, this background/pattern image is produced in the CAD mesh. Thus, a conversion stage 218 makes it possible to define this B/P image in the mesh of the sensor. This B/P image being defined in this way in the sensor mesh, a correlation operation with the real image also defined in the sensor mesh can be carried out. This correlation operation 220 makes it possible to determine the shift of the real image relative to the background/pattern image. This shift is called the "overall shift". Thus, it relates to the shift between two images, whereas the local shift relates to the position of characteristic elements.

The determination of such an overall shift makes it possible, when the invention is applied to the inspection of integrated circuits, to directly integrate the overetching or underetching effects with the reference image due to the correlation between the B/P image and the real image on which said overetching or underetching effects appear.

An addition operation 222 consists of forming the sum of the overall shift values and the decimal equivalent coordinates obtained during the respective stages 220 and 212. The integral portion of this sum corresponds to the coordinates of the crude samples to be taken in the real image. The crude samples corresponding to these coordinates are consequently taken during a sampling operation 224.

The fractional portion of said sum corresponds to the shift of said crude samples with respect to the characteristic elements representing them in the descriptive image. This crude sample centering operation 226 then consists of carrying out a subpixel shift of these samples. This shift e.g. takes place by a linear interpolation and takes account of the fractional portion of the sum formed during stage 222.

These crude samples centered on 226 are then preshifted during a preshift operation 228. This operation 228 consists of systematically shifting each of the centered crude samples in accordance with a plurality of previously defined values. These predefined values are e.g. all values spaced by ⅛ pixel between two integral pixel values. According to this example, the number of predefined values is eight.

When the crude samples processed in this stage 228 have bidimensional patterns, their preshifting is carried out in accordance with rows and columns. In addition, for each processed crude sample sixty four preshifted, centered samples are obtained. All the samples centered in this way in 226 and preshifted in 228 are stored in a library, which is itself contained in the hard disk. These samples which will then be positioned on the background/pattern image are chosen from among the samples contained in the library. These chosen samples are called real samples (reference 208).

Figure 3A:
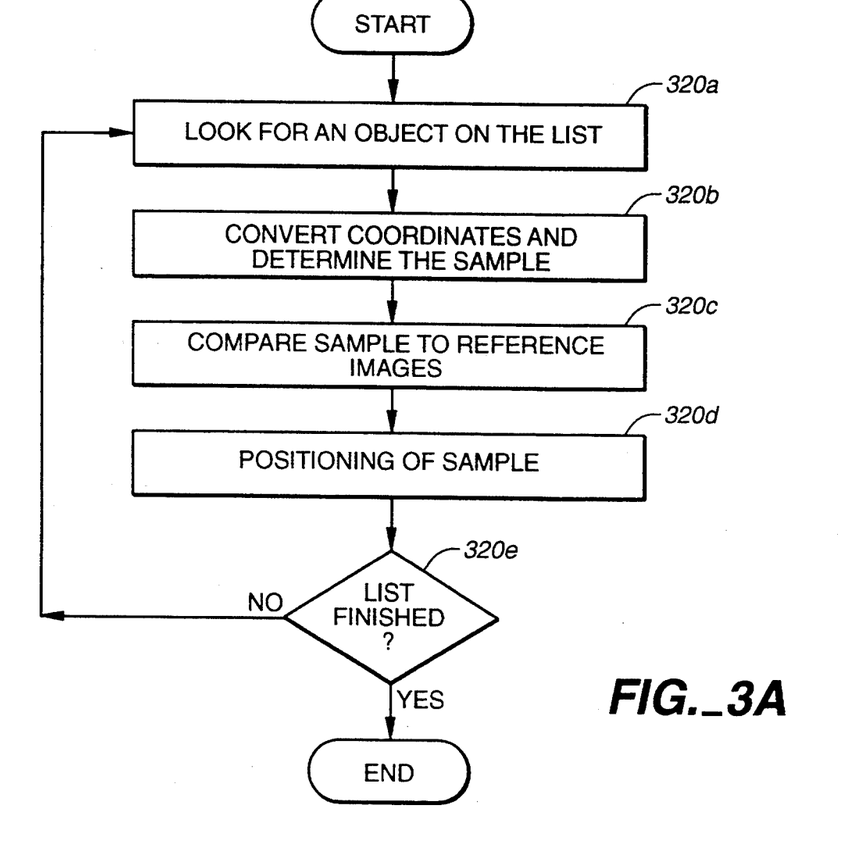
FIGS. 3A and 3B respectively the reading and processing stages of a characteristic sample from within a list of types and the successive applications of these stages for the different lists of types.
Figure 3B:
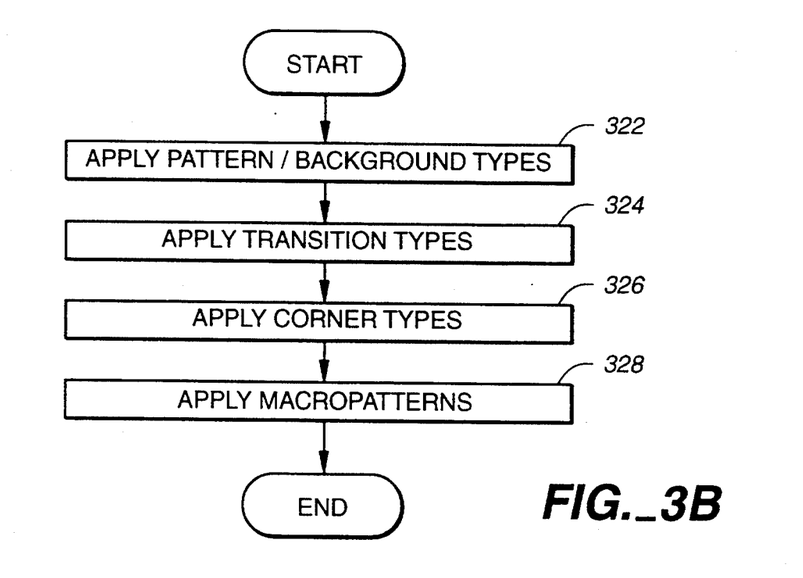

FIG. 3B is the functional diagram of the operation 320 of producing the reference image by the application of real samples constituted by uniform zones, transitions, corners and macropatterns. Operation 320 consists of sticking the real samples taken during the processing stage 200, to pixels identified during the type detection phase 106. As can be gathered from FIG. 3B, the pattern/background types are the first to be applied (operation 322). The background/pattern image is then created. This is followed by the application of the transition types (operation 324), the corner types (operation 326) and the macropatterns (operation 328) in order to create, after each operation, an image having the types applied during the said operation and the preceding operations.

FIG. 3A shows in the form of a flowchart, the different stages to be performed for applying one of the following types: backgrounds/patterns, transitions, corners or macropatterns. The application of a type consists of a reading operation 320a, from within the considered list of types, of a characteristic element having its type and coordinates in the descriptive image (i.e. defined in CAD mesh). A conversion operation 320b makes it possible to convert the coordinates of the characteristic element in the sensor mesh with the aid of the previously described conversion table.

The conversion of these coordinates of the CAD mesh to the sensor mesh also makes it possible to take account of a possible rotation shift of the real image with respect to the reference of the descriptive image. Thus, there can be a rotation shift as a result of the rotation misalignment angle A1 of the integrated circuit with respect to the table on which it is placed for inspection and a rotation misalignment angle A2 between the camera and the table.

The correction of these misalignments of angles A1 and A2 is carried out during the conversion of the coordinates of the CAD mesh into the sensor mesh. Therefore this conversion is carried out by applying the following expressions:

$$Xcap.Pxcap = Xcao.Pxcao.\cos A - Ycao.Pycao.\sin A;$$

$$Ycap.Pycap = Xcao.Pxcao.\sin A + Ycao.Pycao.\cos A,$$

in which:

A is the resulting angular separation between the real image and the descriptive image, Xcap and Ycap are the coordinates read on the real image, Xcao and Ycao are the coordinates read on the descriptive image, Pxcap and Pycap are the intervals in the sensor mesh according to the directions of axes X and Y, Pxcao and Pycao are the intervals in the CAD mesh according to the directions of axes X and Y.

On the basis of the thus converted coordinates, a pair of integral values and a pair of fractional values are determined. A pair of fractional values, as well as the type of the characteristic element making it possible to determine, during a reading operation 320c in the library, the preshifted sample to be applied to the image being synthesized. This chosen sample is then positioned, during the operation 320d, on the image being synthesized by a substitution method.

An end of list test 320e is then applied. For as long as the list of types is not finished (answer no to the test), the operations 320a, 320b, 320c, 320d are repeated for characteristic elements which are on each occasion different. When the list of types is finished (answer yes to the test), the application of the considered type is finished. The application of the following type (cf. FIG. 3B) can then take place.

Figure 4:
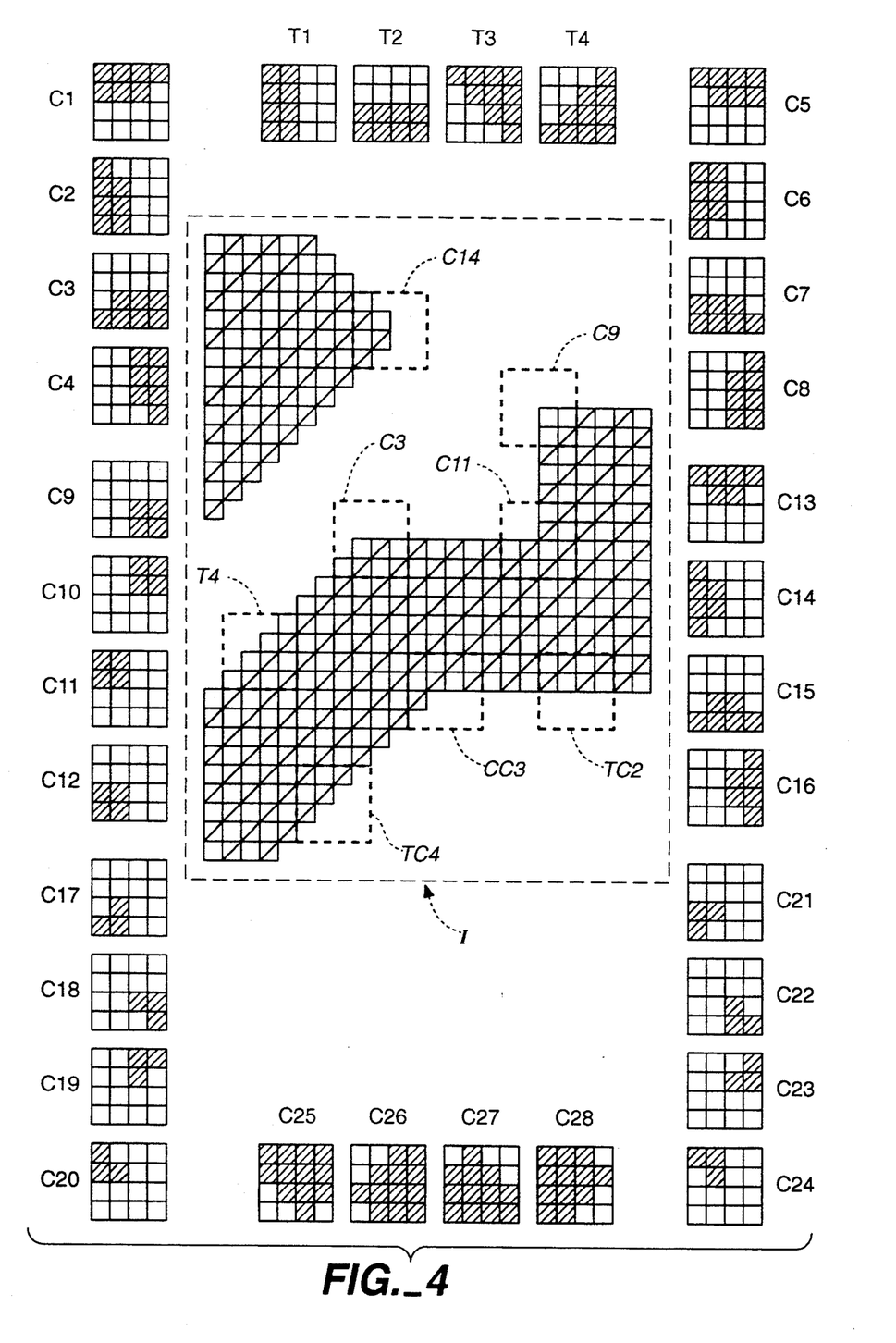
FIG. 4 a representation of characteristic elements sought in the descriptive image of the object (i.e. in the binary image) during operation b) of determining the coordinates of said characteristic elements.

FIG. 4 shows an example of the different patterns sought during the position detection operation. This operation consists of identifying on the descriptive image the application points of the real samples. This detection consists of a decoding of the configurations corresponding to the transitions and the corners.

On considering on an image four main directions (oriented according to the angle 0°, 45°, 90° and 135° C.), there are generally fifty six types of corners, whereof twenty eight are represented by the matrixes C1 to C28 in FIG. 4, whilst the twenty eight, not shown matrixes are the complementary corners of said matrixes C1 to C28. The term "complementary corners" is understood to mean the matrixes of corners in which the clear areas of the corners shown in FIG. 4 are grey areas in the case of complementary corners and vice versa.

There are then eight configurations of transitions:
a vertical transition T1 and its not shown complementary,
a horizontal transition T2 and its complementary TC2, represented in the example of the binary image I,
a descending transition T3 (gradient 135°) and its complementary,
a rising transition T4 (gradient 45°) and its complementary TC4.

In the dotted area I, is shown an example of a binary image in which the different corners and transitions are sought. On this binary image, it is possible to reference the corners C14, C9 and C3, the corners CC11 and CC3 complementary of the respective corners C11 and C3. It is also possible to reference the transition T4 and the transitions TC4 and TC2 complementary of the respective transitions T4 and T2.

According to an embodiment of the invention, it is possible to limit the number of transitions and corners sampled during learning, by using axial symmetries, which e.g. transform a corner C10 and a corner C11.

Figure 5A:
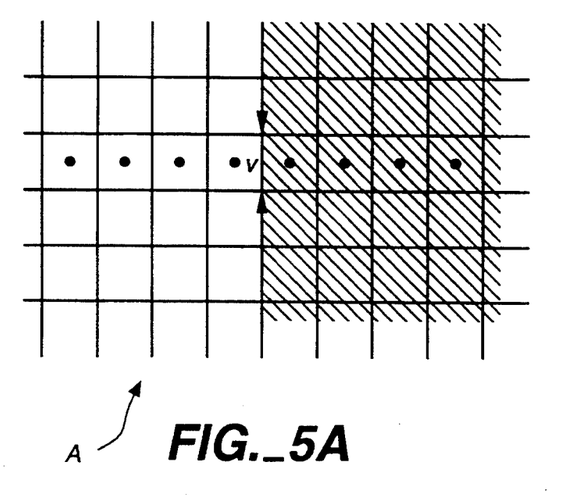
FIGS. 5A and 5B representations of the positioning of the characteristic elements, such as transitions and corners during the positioning operation g).
Figure 5B:
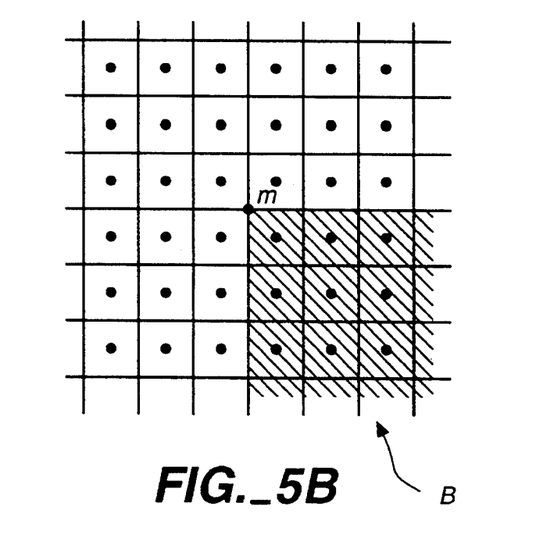
Figures 6A, 6B, 6C, 6D, 6E:
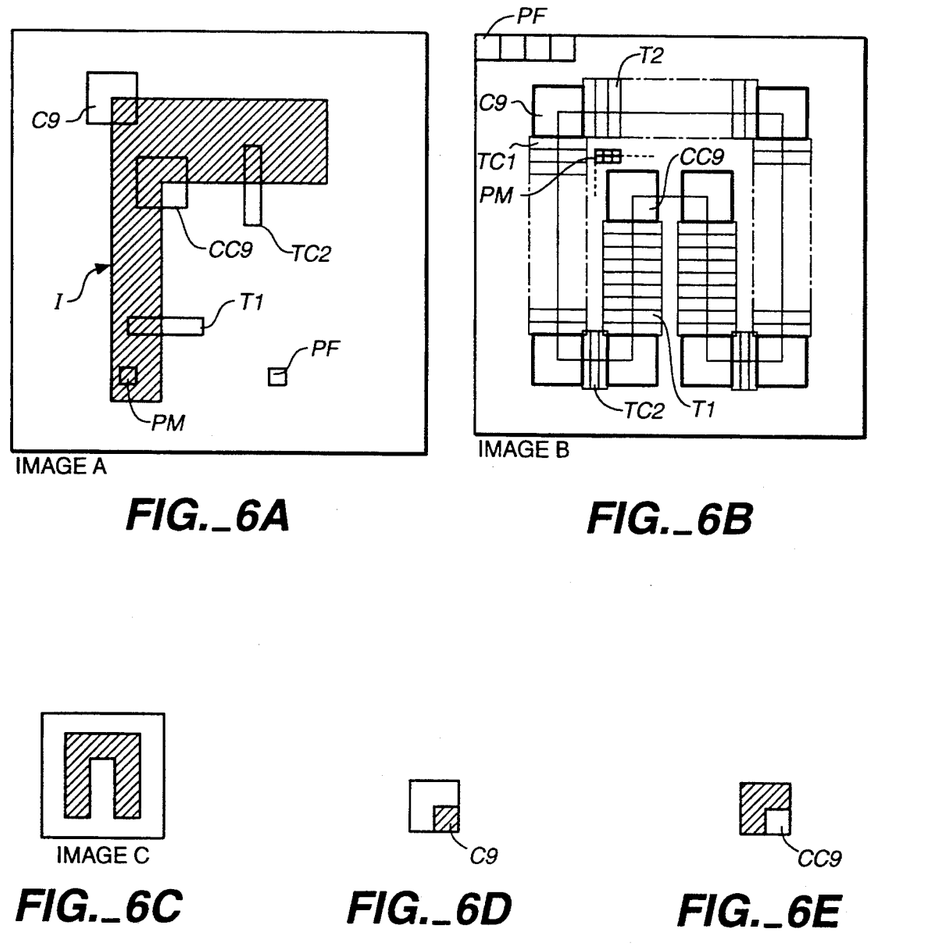
FIGS. 6A-6I examples of producing a reference image according to the process of the invention.
Figure 6F:
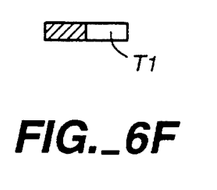
Figure 6G:
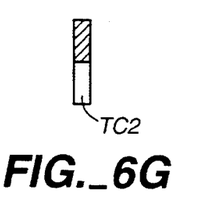
Figure 6H:
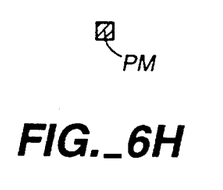
Figure 6I:
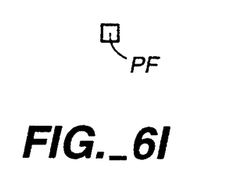

FIG. 5 shows a transition in the form of a transition vector and a corner in the form of a corner matrix during the "sticking" 320 (also called "application") of the real samples to the descriptive image. These vectors and matrixes are advantageously given the same length and side dimension, so as to easily reference the centre of said vector and said matrix.

Zone A of FIG. 5 shows a vector of centre v, positioned in such a way that its centre corresponds to the transition of the binary image.

Zone B of FIG. 5 shows a matrix of centre m positioned so that its centre corresponds to the corner of the binary matrix.

In order to permit a better understanding of the process described hereinbefore, FIG. 6 represents an example of performing the process according to the invention. On image A of FIG. 6 is shown a learning image with its characteristic image elements, such as the corner C9, complementary corner CC9, the vertical transition T1, the complementary horizontal transition TC2 and the pixels of the first uniform zone type PF and the second uniform zone type PM. On image B of FIG. 6 is shown the image obtained at the time of applying the real samples to the binary image, as a function of the list of positions obtained in the preprocessing phase. On image C of FIG. 6 is shown the synthesized image obtained and which will be considered as the reference image at the time of inspecting the objects.

The example of FIG. 6 corresponds to the simple case of a not very dense circuit.

We claim:
1. Process for producing a synthesized reference image with the aid of image processing means and cameras on the basis of a descriptive image of an object to be inspected contained in the processing means and defined in a first format relative to the processing means, comprising the following steps:
  a) determining, in the descriptive image, characteristic elements of the object;
  b) determining the coordinates of the characteristic elements in the descriptive image;
  c) acquiring with the aid of cameras, of at least one real image of the object defined in a second format relative to said cameras;
  d) sampling on a real image of the object for the purpose of obtaining samples of at least one characteristic element of the real image;
  e) changing the first format of the descriptive image of the object and the coordinates of the characteristic elements into an equivalent descriptive image and equivalent coordinates of the characteristic elements defined in the second format, so that the samples of at least one characteristic element of the real image correspond to at least one characteristic element in the characteristic elements of the equivalent descriptive image of the object;
  f) centering the samples as a function of the equivalent coordinates obtained during the format change operation e) to form centered samples;
  shifting the centered Samples in accordance with a plurality of predefined values so as to form preshifted centered samples; and
  h) applying the preshifted centered samples to the corresponding at least one of the characteristic elements of the equivalent descriptive image given in the second format.

2. Process according to claim 1, characterized in that it also incorporates an overall shift operation (220) performed after the format change operation e) and consisting of the determination of an overall shift value of the real image of the object compared with the equivalent descriptive image, by applying a correlation between said real and equivalent descriptive images.

3. Process according to claim 1 wherein the format change operation e) consists of deducing the equivalent coordinates of the characteristic elements obtained during the format change operation e) from integral values of the coordinates and local shift fractional values, wherein the integral values of the coordinates correspond to the equivalent coordinates of the characteristic elements defined in the second format and the local shift fractional values correspond to a local shift of the equivalent coordinates.

4. Process according to claim 3, characterized in that the sampling operation d) firstly consists of choosing the samples, whose coordinates in the real image of the object correspond to the integral values of the coordinates obtained during the format change operation e).

5. Process according to claim 4 wherein the shift operation also consists of establishing a table of the preshifted, centered samples accumulated from step g), the preshifted, centered samples for applying to the corresponding at least one of the characteristic elements of the equivalent descriptive image given in the second format being chosen from the table.

6. Process according to claim 1, characterized in that the format change operation e) consists of converting (210) the descriptive image of the object and the coordinates of the characteristic elements of the first format into the second format with the aid of a conversion table.

7. Process according to claim 1, characterized in that it includes, between the operation c) of acquiring the real image of the object and the format change operation e), an operation (214,216) of producing a grey level image, which is defined in the first format and obtained by introducing, into the descriptive image of the object, grey levels read on the real image of the object.

* * * * *